United States Patent [19]

Janssen et al.

[11] Patent Number: 4,768,180
[45] Date of Patent: Aug. 30, 1988

[54] MULTISTAGE TRACKING SYSTEM

[75] Inventors: Piet J. M. Janssen, Colorado Springs; Ger L. M. Jansen, Widefield, both of Colo.

[73] Assignee: Laser Magnetic Storage International Company, Colorado Springs, Colo.

[21] Appl. No.: 840,058

[22] Filed: Mar. 17, 1986

[51] Int. Cl.$^4$ .............................................. G11B 7/09
[52] U.S. Cl. ...................................................... 369/44
[58] Field of Search ...................... 369/44–46, 369/111, 30, 32; 250/201 DF; 350/342

[56] References Cited

U.S. PATENT DOCUMENTS

| Re. 29,963 | 4/1979 | Janssen | 369/46 |
|---|---|---|---|
| 3,829,622 | 8/1974 | Elliot . | |
| 3,962,688 | 6/1976 | Westerberg | 369/44 |
| 4,057,832 | 11/1977 | Kappert | 369/44 |
| 4,225,873 | 9/1980 | Winslow | 346/76 L |
| 4,271,334 | 6/1981 | Yardy | 369/44 |
| 4,275,275 | 6/1981 | Bricot et al. | 369/44 |
| 4,330,880 | 5/1982 | Van Dijk | 369/44 |
| 4,419,750 | 12/1983 | Howe . | |
| 4,432,082 | 2/1984 | Hsieh et al. | 369/44 |
| 4,466,088 | 8/1984 | Trethewey . | |
| 4,520,471 | 5/1985 | Carlin . | |
| 4,545,046 | 10/1985 | Jansen et al. | 369/44 |
| 4,545,65 | 10/1985 | Kato et al. . | |
| 4,556,964 | 12/1985 | Trethewey . | |
| 4,564,754 | 1/1986 | Budde et al. . | |
| 4,571,712 | 2/1986 | Romano et al. | 369/44 |
| 4,621,351 | 11/1986 | Baer et al. | 369/44 |
| 4,635,244 | 1/1987 | Gotoh . | |
| 4,688,201 | 8/1987 | Towner et al. . | |

Primary Examiner—Donald McElheny, Jr.
Attorney, Agent, or Firm—Sheridan, Ross & McIntosh

[57] ABSTRACT

A multistage tracking system for an optical disk used in recording, storing and transmitting data and the like. The tracking system using a movable sled with objective lens for coarse tracking of individual tracks on the disk and a stationary tilting mirror providing fine tracking on a selected track.

18 Claims, 2 Drawing Sheets

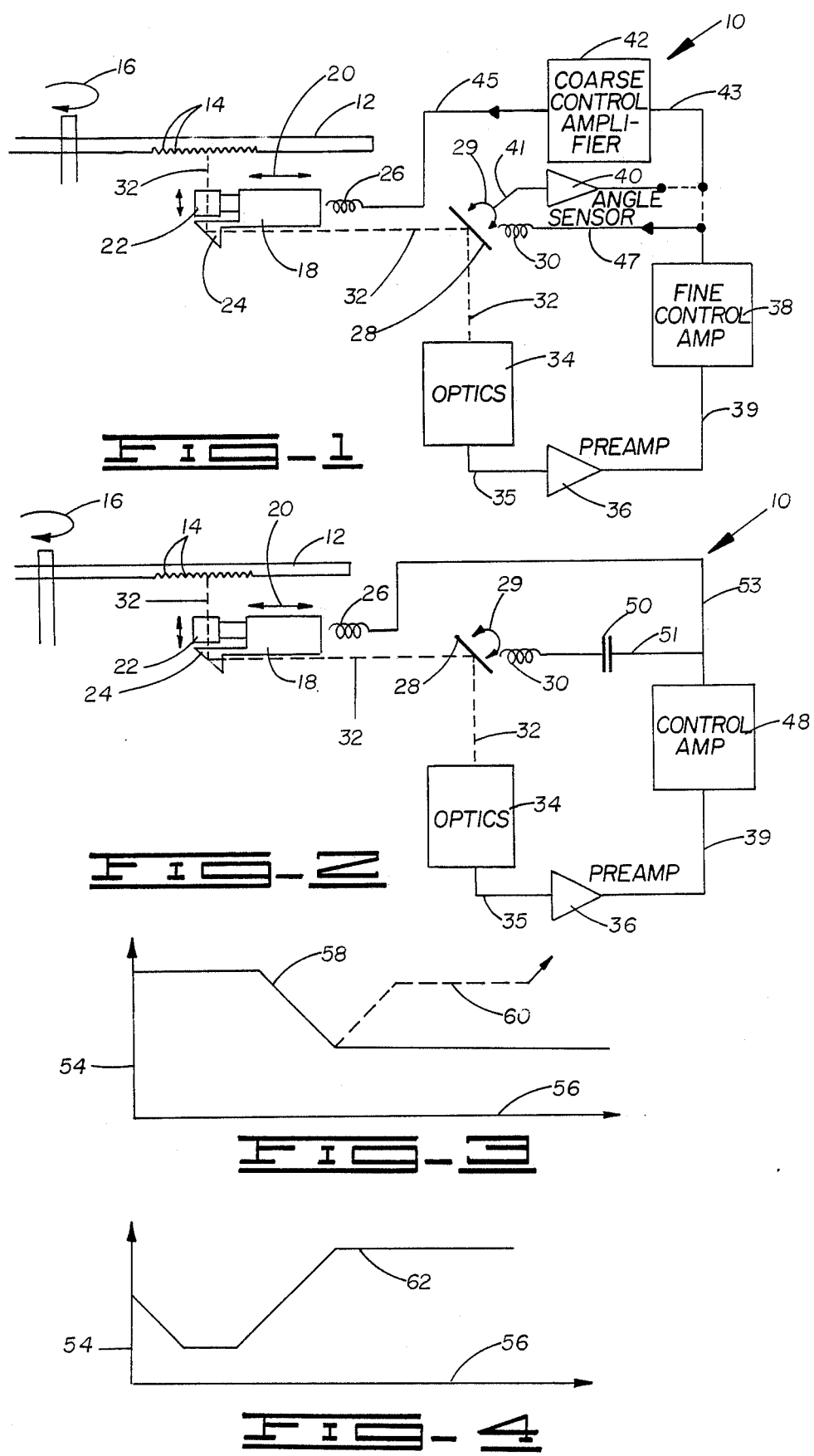

MULTISTAGE TRACKING SYSTEM

BACKGROUND OF THE INVENTION

This invention relates to a rotating disk tracking system and more particularly, but not by way of limitation, to a multistage tracking system for an optical disk.

Heretofore, multistage tracking systems for an optical disk used a fine tracking element on a movable part such as a slow moving sled, i.e. laser vision or a bulky sled such as a gas laser based optical data recorder. When using a slow moving sled most of the work was done by the fine tracking element. The optical effects associated with large amplitude motion of the fine tracking element for instance vignetting, precludes positioning the mirror sled far from the objective lens. Therefore, it was found that the fine tracking element must be located on the sled. When using a small high performance system, it is an advantage to have a stationary fine tracking element because high speed access requires a lightweight high band width sled. This requires the sled to be capable of doing most of the work while tracking. The fine tracking element then will only have to move very slightly, thus avoiding the above-mentioned optical effects. If the fine tracking element is on the sled, this will contribute to the mass and complexity of the sled thereby reducing its response and consequently the element will have to do more of the work than in the previous situation.

The above-mentioned problems related to a multistage tracking system for an optical disk has led to invention as described herein. In the following U.S. patents, U.S. Pat. Nos. 4,225,873 to Winslow, Re. 29,963 to Janssen, and 3,829,622 to Elliot, optical systems are described having control systems with interacting loops and movable sleds with articulating mirrors thereon. None of these prior art patents particular point out the unique features and the advantages of the subject multistage tracking system as described herein.

SUMMARY OF THE INVENTION

The subject multistage tracking system provides a small high performance system with the advantage of a stationary tilting mirror removed from the movable sled, thereby providing high speed access and coarse and fine tracking on an optical rotating disk.

The multistage tracking system provides a movable sled with objective lens for coarse tracking a desired track on the otical disk with a stationary tilting mirror providing fine tracking on the disk.

The multistage tracking system for a rotating optical disk includes a movable sled with a movable objective lens and fixed mirror. The sled is disposed below the tracks on the disk. The sled includes a sled drive means for moving the objective lens near a desired track. A stationary tilting mirror is disposed adjacent the sled. The mirror has a mirror drive means for tilting the mirror for fine tracking. Optics is electrically connected to the stationary tilting mirror drive means and sled drive means and provides a light beam directed toward the tilting mirror. The tilting mirror reflects the light toward the fixed mirror below the objective lens and focuses the beam through the lens onto a desired track. The optics provide an opically generated position signal to the mirror drive means and the sled drive means for coarse tracking and fine tracking on the rotating optical disk.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 illustrates a schematic of the multistage tracking system.

FIG. 2 illustrates an alternate embodiment of the multistage tracking system with parallel or series driven actuator coils.

FIGS. 3 and 4 illustrate frequency curves of the tilting mirror amplification and sled amplification.

DETAILED DESCRIPTION OF THE DRAWINGS

Figure 5:
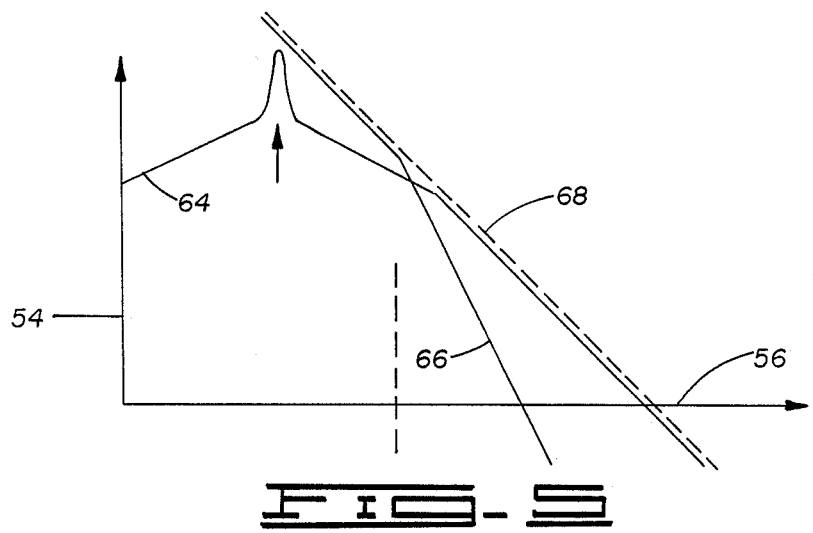
FIGS. 5 and 6 illustrate curves illustrating the resonance frequency of the tilting mirror and sled drive coil.

In FIG. 1 the multistage tracking system is designated by general reference numeral 10. The system 10 is used with a rotating optical disk 12 having a plurality of tracks 14 thereon. The disk 12 is rotated as indicated by arrow 16. A movable sled 18 is positioned above the tracks 14 and moves radially across the width of the tracks as indicated by arrow 20. The movable sled 18 includes an objective lens 22 disposed above a 45 degree fixed mirror 24. The sled 18 is moved radially by an electric motor connected to a drive coil 26. The motor is not shown in the drawings. While the electric motor and drive coil 26 are used to move the sled 18 for coarse tracking, it should be appreciated that various types of drive means could be used equally well.

A stationary tilting mirror 28 is disposed adjacent the disk 12 and is connected to an electric motor and a mirror drive coil 30. While the tilting mirror 28 is driven electrically it could also be driven by a variety of different drive means. A light beam indicated by dotted lines 32 is projected from optics 34. The beam 32 may be a parallel or collimated beam which is directed toward the 45 degree stationary tilting mirror 28. The mirror 28 reflects the light toward the fixed 45 degree mirror 24 on the movable sled 18. The beam 32 is focused through the objective lens 22 onto a desired track 14 on the disk 12. The tilting of the mirror 28 is indicated by arrow 29.

The multistage tracking system 10 incorporates two stages; a coarse tracking loop using the sled 18 and a fine tracking loop using the stationary tilting mirror 28.

The fine tracking loop consists of an optically generated position signal E-RAD which is fed through from the optics 34 via lead 35 to a preamplifier 36 and to a fine control amplifier 38 via lead 39. The fine control amplifier 38 drives the drive coil 30 of the stationary tilting mirror 28.

The coarse tracking loop is fed using an angle error signal from the fine tracking mirror 28. The angle error signal can be obtained in two ways. One way is using an angle sensor 40 connected to the mirror 28 via lead 41. When using the angle sensor 40, driving of the coarse loop can be independent of the characteristics of the fine tracking mirror. It is possible to use a mirror 28 with slide bearings and not be affected by the associated friction. The angle sensor 40 feeds the signal through a coarse control amplifier 42 via leads 43 and 45 to the sled drive coil 26. In the alternative and without using the angle sensor 40, the mirror needs to be spring suspended and the bandwidth of the coarse loop is limited by the resonance frequency of the fine tracking mirror 28. Below the resonance frequency the current of the mirror drive coil 30 is proportional to the angle of the tilting mirror 28 and the signal is fed to the coarse control amplifier 42 via leads 47 and 43.

In FIG. 2 an alternate embodiment of the multistage tracking system 10 is shown using a control amplifier 48 rather than the fine control amplifier 38 and the coarse control amplifier 42. In this embodiment the control amplifier 48 feeds the two drive coils 30 and 26. The low frequency part of the drive current is directed towards the sled drive coil 26 and the high frequency part of the current directed towards the mirror drive 30. The sled drive coil 26 has a higher inductance than the mirror drive coil 30. With the addition of a high-pass element such as a capacitor 50 connected via lead 41 to the mirror drive coil 30 all the low frequency current from the control amplifier 48 will be directed to the sled drive coil 26 via lead 53. The high frequency portion of the drive current will pass over the capacitor 50 to the mirror drive coil 30.

In FIGS. 3 and 4, log gain of the controller is shown as a vertical line 54 and log frequency is shown as a horizontal line 56. The resonance indicated by line 58 of the tilting mirror 28 is set at a high frequency, for example a few kilohertz, and beyond the bandwidth of the fine tracking loop as shown in FIGS. 1 and 2. Without using the angle sensor 40, the bandwidth of the coarse loop can approach the bandwidth of the fine tracking loop. In order to avoid vignetting of the light beam 32 only very small angles of the tilting mirror 28 are allowed. The bandwidth of the coarse system therefore, has to be very high. In FIG. 3, a dotted line 60 illustrates the lead required when driving the mirror beyond its resonance. FIG. 4 illustrates the transfer of the sled control amplifier indicated by line 62.

In FIGS. 5 and 6 log gain is again shown as a vertical line 54 with log frequency shown as a horizontal line 56. In FIG. 5 line 64 illustrates the mirror loop gain with line 66 illustrating the sled loop gain. A total transfer of the mirror loop and slep loop is illustrated by a dotted line 68.

Figure 6:
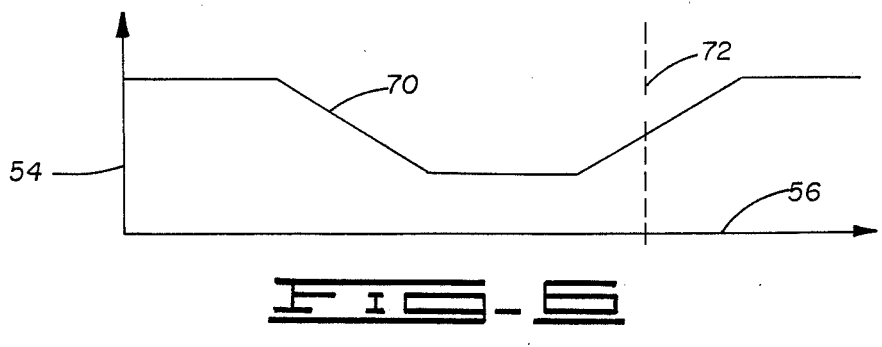
Figure 7:
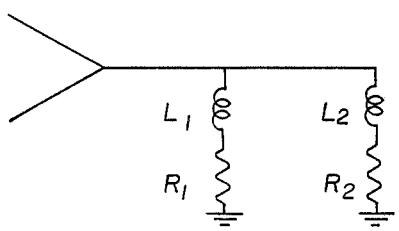
FIG. 7, and 7A illustrate electrical diagrams for series or parallel driven actuator coils.
Figure 7A:
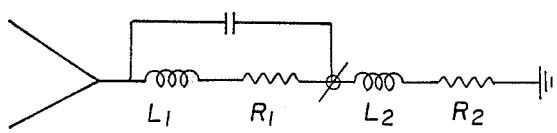

In FIG. 6 a controller transfer is indicated by line 70 with a vertical dotted line 72 representing a crossover total loop. FIGS. 7, and 7A illustrate alternate circuiting for series or parallel drive actuator coils with FIG. 7 being a parallel wiring system and FIG. 7A being a alternate series drive circuit application.

From reviewing the above detailed description of the multistage tracking system 10, it can be seen that the system applies high-pass filtering for fine mirror tracking that reduces excursions and thus avoids associated adverse optical effects thereby providing improved coarse and fine tracking used in conjunction with optical recording disks and the like.

Changes may be made in the construction and arrangement of the parts or elements of the embodiments as described herein without departing from the spirit or scope of the invention defined in the following claims.

What is claimed is:

1. A multistage tracking system, for a rotating optical recording disk having a data recording surface for recording data in tracks, the system comprising:
    a movable sled with an objective lens and fixed mirror, the sled disposed adjacent to the tracks on the disk, the sled having electrically controllable sled drive means for moving the objective lens and the fixed mirror near a desired track;
    a stationary tilting mirror disposed adjacent the sled, the tilting mirror having an electrically controllable mirror drive means for tilting the mirror; and
    optic means for providing a light beam directed toward the tilting mirror, the tilting mirror reflecting the light beam toward the fixed mirror, the fixed mirror reflecting the light beam to the objective leans, the objective lens focusing the light beam to a spot on the data recording surface, the optic means further providing an optically generated position signal;
    means for controlling movement of said electrically controllable mirror drive means using said position signal and;
    means for controlling movement of said electrically controllable sled drive means using said position signal.

2. The system as described in claim 1 further including a preamplifier and fine control amplifier electrically wired between the optics means and the mirror drive means.

3. The system as described in claim 2 further including a coarse control amplifier electrically wired between the mirror drive means and the sled drive means.

4. A tracking system, as claimed in claim 1, wherein:
    said means for controlling movement of said electrically controllable sled drive means comprises:
    means for sensing the position of said stationary tilting mirror and providing a mirror position signal related to said position of said stationary tilting mirror; and
    means for using said mirror position signal to provide an electrical control signal responsive to changes in said position signal for controlling movement of said electrically controllable sled drive means.

5. A tracking system, as claimed in claim 4, wherein:
    said means for sensing the position of said stationary tilting mirror comprises an angle sensor.

6. A tracking system, as claimed in claim 1, wherein:
    said means for controlling movement of said electrically controllable mirror drive means comprises
    first amplifier means to generate a first control signal from said position signal; and
    means for controlling movement of said mirror drive means using said first control signal; and
    said means for controlling movement of said electrically controllable sled drive means comprises
    second amplifier means to generate a second control signal from said first control signal; and
    means for controlling said electrically controllable sled drive means using said second control signal.

7. A tracking system, as claimed in claim 1, wherein:
    said means for controlling movement of said electrically controllable mirror drive means comprises:
    an amplifier for generating a first control signal from said position signal;
    high-pass filter means for obtaining a highfrequency control signal from said first control signal; and
    means for operating said mirror drive means using said high-frequency signal.

8. A tracking system, as claimed in claim 1, further comprising:

means for limiting the angular movement of said stationary tilting mirror wherein vignetting is substantially avoided by said limiting.

9. A multistage tracking system for a rotating optical recording disk having a data recording surface for recording data in tracks, the system comprising:
   a movable sled with an objective lens and fixed mirror, the sled disposed adjacent to the tracks on the disk, the sled having an electrically controllable sled drive means for moving the objective lens and the fixed mirror near a desired track;
   a stationary tilting mirror disposed adjacent the sled, the tilting mirror having an electrically controllable mirror drive means for tilting the mirror;
   optic means for providing a light beam directed toward the tilting mirror, the tilting mirror reflecting the light beam toward the fixed mirror, the fixed mirror reflecting the light beam to the objective lens, the objective lens focusing the light beam to a spot on the data recording surface, the optic means further providing an optically generated position signal;
   means for modifying said position signal by a preamplifier and a control amplifier to provide first and second control signals;
   means for controlling movement of said electrically controllable mirror drive means using said first control signal; and
   means for controlling movement of said electrically controllable sled drive means using said second control signal.

10. The system as described in claim 9 wherein the control amplifier provides an amplified signal, and wherein said system further comprises means for producing a low frequency drive current and a high frequency drive current from said amplified signal, said low frequency drive current directed toward the sled drive means and said high frequency current directed toward the mirror drive means.

11. The system as described in claim 10 further including a capacitor wired between the control amplifier and the mirror drive coil.

12. A method for positioning a light beam on a desired track of a rotating optical recording disk having a recording surface for recording data in tracks, the method comprising:
   providing an optical disk system including:
      a sled with an objective lens;
      first electrically controllable means for moving said sled adjacent to said tracks;
      a movable mirror;
      second electrically controllable means for moving said movable mirror with respect to said disk;
      optic means for providing said light beam and directing said light beam towards said movable mirror;
      means for detecting the position of said beam with respect to said desired track;
   obtaining a first electrical signal related to said position, using said means for detecting;
   locating said movable mirror off of said sled wherein movement of said sled does not directly create movement of said mirror;
   using said first electrical signal to control said first electrically controllable means wherein said sled is moved to position said objective lens adjacent to said desired track; and
   using said first electrical signal to control said second electrically controllable means wherein said movable mirror is moved to a position wherein said beam is reflected from said movable mirror towards said objective lens, and said beam passes through said objective lens to be positioned on said desired track.

13. A method, as claimed in claim 12, wherein said step of obtaining a first electrical signal comprises:
   obtaining a signal responsive to changes in said position signal and related to the position of said movable mirror.

14. A method, as claimed in claim 12, wherein:
   said step of using said first electrical signal to control said first electrically controllable means comprises using a first amplifier to obtain a second electrical signal from said first electric signal; and
   said step of using said first electrical signal to control said second electrically controllable means comprises using a second amplifier to generate a third signal from said second signal for controlling said second electrically controllable means.

15. A method, as claimed in claim 12, wherein:
   said step of using said first electrical signal to control said second electrically controllable means comprises obtaining a high-frequency signal from said first electrical signal using a high-pass filter for controlling said second electrically controllable means.

16. A method for positioning a light beam on a desired track of a rotating optical recording disk having a recording surface for recording data in tracks, the method comprising:
   providing an optical disk system including:
      a sled with an objective lens;
      first electrically controllable means for moving said sled adjacent to said tracks;
      a movable mirror;
      second electrically controllable means for moving said movable mirror with respect to said disk;
      optic means for providing said light beam and directing said light beam towards said movable mirror;
      means for detecting the position of said beam with respect to said desired track;
   obtaining a first electrical signal related to said position, using said means for detecting;
   locating said movable mirror off of said sled wherein movement of said sled does not directly create movement of said mirror;
   moving said sled to a position wherein said objective lens is adjacent to said desired track using said first electrically controllable means;
   using said first electrical signal to control said second electrically controllable means wherein said movable mirror is moved to a position wherein said beam is reflected from said movable mirror towards said objective lens, and said beam passes through said objective lens to be positioned on said desired track; and
   limiting the angular movement of said stationary tilting mirror wherein vignetting is substantially avoided by said limiting.

17. A method, as claimed in claim 16, wherein:
   said step of moving said sled comprises using said first electrical signal to cotnrol said first electrically controllable means.

18. Apparatus for positioning a light beam on a desired track of a rotating optical recording disk having a recording surface for recording data in tracks, comprising:
- a sled with an objective lens;
- first electrically controllable means for moving said sled adjacent to said tracks;
- a movable mirror located off of said sled wherein movement of said sled does not directly create movement of said mirror;
- second electrically controllable means for moving said movable mirror with respect to said disk;
- optic means for providing said light beam and directing said light beam towards said movable mirror;
- means for detecting the position of said beam with respect to said desired track;
- means for obtaining a first electrical signal related to said position, using said means for detecting;
- means for controlling said first electrically controllable means wherein said sled is moved to position said objective lens adjacent to said desired track;
- using said first electrical signal to control said second electrically controllable means wherein said movable mirror is moved to a position wherein said beam is reflected from said movable mirror toward said objective lens, and said beam passes through said objective lens to be positioned on said desired track; and
- means for limiting the angular movement of said stationary tilting mirror wherein vignetting is substantially avoided by said limiting.

* * * * *